United States Patent
Tsutsumi

(10) Patent No.: US 7,961,951 B2
(45) Date of Patent: Jun. 14, 2011

(54) IMAGE PROCESSING APPARATUS CAPABLE OF ACCURATELY REMOVING ISOLATED POINT NOISE, IMAGE PROCESSING METHOD, AND COMPUTER READABLE MEDIUM

(75) Inventor: Takahiro Tsutsumi, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 852 days.

(21) Appl. No.: 12/000,432

(22) Filed: Dec. 12, 2007

(65) Prior Publication Data

US 2009/0041346 A1  Feb. 12, 2009

(30) Foreign Application Priority Data

Aug. 10, 2007  (JP) .................................. 2007-209324

(51) Int. Cl.
G06K 9/48 (2006.01)

(52) U.S. Cl. ........ 382/199; 382/192; 382/274; 382/100; 382/232; 382/282; 358/3.08; 358/3.2; 358/3.21; 358/1.9; 358/3.28

(58) Field of Classification Search .................. 382/199, 382/192, 274, 100, 232, 282; 358/3.08, 3.2, 358/3.21, 1.9, 3.28
See application file for complete search history.

(56) References Cited

U.S. PATENT DOCUMENTS

| | | | |
|---|---|---|---|
| 5,960,121 A | 9/1999 | Takahashi | |
| 2004/0114187 A1* | 6/2004 | Furukawa | ..................... 358/3.08 |
| 2008/0018919 A1* | 1/2008 | Ohkawa | .......................... 358/1.9 |

FOREIGN PATENT DOCUMENTS

| | | |
|---|---|---|
| JP | 02-267678 | 11/1990 |
| JP | 08-272952 | 10/1996 |
| JP | 2000-253257 A | 9/2000 |
| JP | 2006-287603 | 10/2006 |
| JP | 2007-067932 | 3/2007 |
| WO | WO 2007/026924 | 3/2007 |

OTHER PUBLICATIONS

Notice of Grounds of Rejection in JP 2007-209324 dated Jan. 20, 2009, and an English Translation thereof.
Notice of Grounds of Rejection in JP 2007-209324 dated May 26, 2009, and an English Translation thereof.

* cited by examiner

*Primary Examiner* — Mike Rahmjoo
(74) *Attorney, Agent, or Firm* — Buchanan Ingersoll & Rooney PC

(57) ABSTRACT

An isolated point detection portion detects an isolated point in image data input from an image data adjustment portion. An isolated point removal portion makes a replacement of image data at a point of an isolated point detected by the isolated point detection portion. An edge identification portion performs edge identification for identifying a character region for the image data from which the isolated point has been removed by the isolated point removal portion. In this technique, edge identification is performed after the isolated point is erased by performing isolated point identification as a preliminary step of edge identification, so that isolated point noise can be removed with high accuracy.

13 Claims, 8 Drawing Sheets

FIG.4
【1 × 1 ISOLATED POINT FILTER】
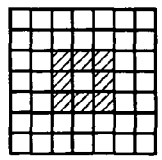
【2 × 1 ISOLATED POINT FILTER】
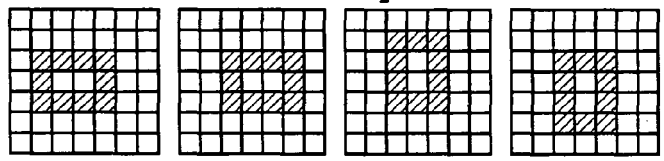
【2 × 2 ISOLATED POINT FILTER】
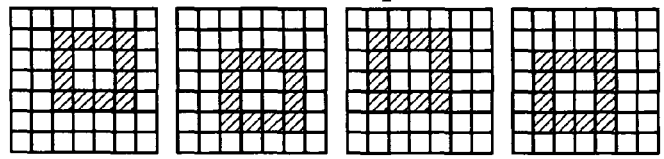
【2 × 3 ISOLATED POINT FILTER】
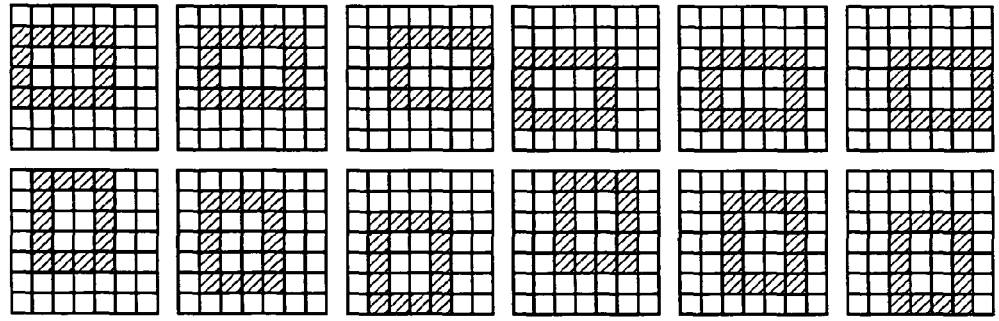

IMAGE PROCESSING APPARATUS CAPABLE OF ACCURATELY REMOVING ISOLATED POINT NOISE, IMAGE PROCESSING METHOD, AND COMPUTER READABLE MEDIUM

This application is based on Japanese Patent Application No. 2007-209324 filed with the Japan Patent Office on Aug. 10, 2007, the entire content of which is hereby incorporated by reference.

BACKGROUND OF THE INVENTION

1. Field of the Invention

The present invention relates to an image processing apparatus, and more particularly to an image processing apparatus performing character region identification on image data by removing isolated point noise in an image, an image processing method, and a computer readable medium.

2. Description of the Related Art

Conventionally, there exists a system in which a paper document is read by a scanner, the read image data is input to a host computer, and the input data (copy image) undergoes page handling and is printed.

In recent years, a document processed in a host computer is often handed over as electronic data, although it is still often handed over as a paper document.

However, when a document is handed over as a paper document, it has to be read by a scanner, and unfortunately, isolated point noise such as a black point appears on the read image data.

Conventionally, as disclosed in Japanese Laid-Open Patent Publication No. 2000-253257, in character region identification, in a part that is not determined as an isolated point as a result of filter processing for edge reinforcement, data subjected to edge reinforcement is selected, while in a part that is determined as an isolated point, data not subjected to edge reinforcement is selected. In short, such a technique has been employed in that isolated point noise is removed based on the result of filter processing for edge reinforcement.

However, in the conventional technique, a part that is an isolated point is not completely equivalent to the result of filter processing for edge reinforcement, and thus isolated point noise cannot be removed completely.

SUMMARY OF THE INVENTION

The present invention is made to solve the aforementioned problem, and an object of the present invention is to provide an image processing apparatus capable of accurately removing isolated point noise in character region identification, an image processing method, and a computer readable medium.

An image processing apparatus in accordance with the present invention includes a character region identification portion identifying a character region of read image data obtained by reading an input image. The character region identification portion includes an isolated point detection portion for detecting an isolated point of the read image data, an isolated point removal portion for making a replacement of image data at a point of detection result by the isolated point detection portion, an edge identification portion performing edge identification of the read image data from which an isolated point is removed, and a character region specification portion specifying a character region of the read image data after the edge identification.

Preferably, the isolated point detection portion includes an isolated point filter operation portion performing a gradation operation for a target pixel region and a peripheral region of the target pixel region of the read image data, and a determination portion identifying an isolated point based on mutual gradation comparison, based on an operation result of the isolated point filter operation portion. The isolated point removal portion includes a first pixel specification portion specifying a pixel having maximum gradation of pixels in the peripheral region of the target pixel region, a second pixel specification portion specifying a pixel having minimum gradation of pixels in the peripheral region of the target pixel region, and a selection portion outputting the target pixel region as it is or replacing the target pixel region with a pixel specified by one of the first and second pixel specification portions for output based on a determination result of the determination portion.

In particular, the determination portion identifies an isolated point or not based on whether or not an absolute value of difference between average gradation of pixels in the target pixel region and maximum gradation and minimum gradation of pixels in the peripheral region of the target pixel region is equal to or greater than a threshold value.

In particular, if the difference between maximum gradation and minimum gradation of pixels in the peripheral region of the target pixel region and average gradation of pixels in the target pixel region is positive, the determination portion further determines a white isolated point, and if the difference between maximum gradation and minimum gradation of pixels in the peripheral region of the target pixel region and average gradation of the target pixel is negative, the determination portion further determines a black isolated point.

In particular, if a white isolated point is determined based on a determination result of the determination portion, the selection portion replaces the target pixel region with a pixel specified by the second pixel specification portion for output, and if a black isolated point is determined based on a determination result of the determination portion, the selection portion replaces the target pixel region with a pixel specified by the first pixel specification portion for output.

Preferably, the isolated point detection portion includes an isolated point filter operation portion performing a gradation operation for a target pixel region and a peripheral region of the target pixel region of the read image data, and a determination portion identifying an isolated point based on mutual gradation comparison, based on an operation result of the isolated point filter operation portion. The isolated point removal portion includes a smoothing processing portion performing smoothing processing of the target pixel region in contrast with the peripheral region, and a selection portion outputting the target pixel region as it is or replacing the target pixel region with a processed result by the smoothing processing portion for output based on a determination result of the determination portion.

Preferably, the read image data includes a plurality of plane data respectively corresponding to multiple colors. A plurality of isolated point detection portions for detecting an isolated point are further provided respectively corresponding to the plurality of plane data. The isolated point removal portion makes a replacement of image data at a point of detection result based on an identification result of the plurality of isolated point detection portions.

Preferably, the isolated point detection portion includes a first isolated point filter operation portion performing a gradation operation for a first target pixel region and a peripheral region of the target pixel region of the read image data, a second isolated point filter operation portion performing a gradation operation for a second target pixel region and a peripheral region of the target pixel region of the read image data, a first determination portion identifying a first isolated point based on mutual gradation comparison based on an operation result of the first isolated point filter operation portion, and a second determination portion identifying a second isolated point based on mutual gradation comparison based on an operation result of the second isolated point filter operation portion. The isolated point removal portion includes a first pixel specification portion specifying a pixel having maximum gradation of pixels in the peripheral region of the first target pixel region, a second pixel specification portion specifying a pixel having minimum gradation of pixels in the peripheral region of the first target pixel region, a third pixel specification portion specifying a pixel having maximum gradation of pixels in the peripheral region of the second target pixel region, a fourth pixel specification portion specifying a pixel having minimum gradation of pixels in the peripheral region of the second target pixel region, and a selection portion outputting the target pixel region as it is or replacing the target pixel region with a pixel specified by one of the first to fourth pixel specification portions for output based on determination results of the first and second determination portions.

In particular, a size of the first target pixel region is different from a size of the second target pixel region.

In accordance with the present invention, an image processing method of identifying a character region of read image data obtained by reading an input image includes the steps of: detecting an isolated point of the read image data; making a replacement of image data at a point of detection result where the isolated point is detected; performing edge identification of the read image data from which the isolated point is removed; and specifying a character region of the read image data after the edge identification.

Preferably, the step of detecting an isolated point includes the steps of performing a gradation operation for a target pixel region and a peripheral region of the target pixel region of the read image data, and identifying an isolated point based on mutual gradation comparison, based on an operation result. The step of making a replacement of image data includes the steps of specifying a pixel having maximum gradation of pixels in the peripheral region of the target pixel region, specifying a pixel having minimum gradation of pixels in the peripheral region of the target pixel region, and outputting the target pixel region as it is or replacing the target pixel region with a pixel having maximum gradation or a pixel having minimum gradation for output based on an identification result of the isolated point.

Preferably, the step of detecting an isolated point includes the steps of performing a gradation operation for a target pixel region and a peripheral region of the target pixel region of the read image data, and identifying an isolated point based on mutual gradation comparison, based on an operation result. The step of making a replacement of image data includes the steps of performing smoothing processing of the target pixel region in contrast with the peripheral region, and outputting the target pixel region as it is or replacing the target pixel region with a result of smoothing processing for output, based on an identification result of identifying an isolated point.

Preferably, the read image data includes a plurality of plane data respectively corresponding to multiple colors. In the step of detecting an isolated point, an isolated point is detected corresponding to each of the plurality of plane data. In the step of making a replacement of image data, image data is replaced at a point of detection result based on an identification result of identifying the isolated point.

Preferably, the step of detecting an isolated point includes the steps of performing a gradation operation for a first target pixel region and a peripheral region of the target pixel region of the read image data, performing a gradation operation for a second target pixel region and a peripheral region of the target pixel region of the read image data, identifying a first isolated point based on mutual gradation comparison based on a gradation operation result for the first target pixel region and the peripheral region of the target pixel region, and identifying a second isolated point based on mutual gradation comparison based on a gradation operation result for the second target pixel region and the peripheral region of the target pixel region. The step of making a replacement of image data includes the steps of specifying a pixel having maximum gradation of pixels in the peripheral region of the first target pixel region, specifying a pixel having minimum gradation of pixels in the peripheral region of the first target pixel region, specifying a pixel having maximum gradation of pixels in the peripheral region of the second target pixel region, specifying a pixel having minimum gradation of pixels in the peripheral region of the second target pixel region, outputting the target pixel region as it is or replacing the first target pixel region with a pixel having maximum gradation or minimum gradation for output based on an identification result of identifying the first isolated point, and outputting the target pixel region as it is or replacing the second target pixel region with a pixel having maximum gradation or minimum gradation for output based on an identification result of identifying the second isolated point.

A computer readable medium in accordance with the present invention having a program recorded thereon for performing identification of a character region of read image data obtained by reading an input image includes the steps of: detecting an isolated point of the read image data; making a replacement of image data at a point of detection result where the isolated point is detected; performing edge identification of the read image data from which the isolated point is removed; and specifying a character region of the read image data after the edge identification.

Preferably, the step of detecting an isolated point includes the steps of performing a gradation operation for a target pixel region and a peripheral region of the target pixel region of the read image data, and identifying an isolated point based on mutual gradation comparison, based on an operation result. The step of making a replacement of image data includes the steps of specifying a pixel having maximum gradation of pixels in the peripheral region of the target pixel region, specifying a pixel having minimum gradation of pixels in the peripheral region of the target pixel region, and outputting the target pixel region as it is or replacing the target pixel region with a pixel having maximum gradation or a pixel having minimum gradation for output based on an identification result of the isolated point.

Preferably, the step of detecting an isolated point includes the steps of performing a gradation operation for a target pixel region and a peripheral region of the target pixel region of the read image data, and identifying an isolated point based on mutual gradation comparison, based on an operation result. The step of making a replacement of image data includes the steps of performing smoothing processing of the target pixel region in contrast with the peripheral region, and outputting the target pixel region as it is or replacing the target pixel region with a result of smoothing processing for output, based on an identification result of identifying an isolated point.

Preferably, the read image data includes a plurality of plane data respectively corresponding to multiple colors. In the step of detecting an isolated point, an isolated point is detected corresponding to each of the plurality of plane data. In the step of making a replacement of image data, image data is replaced at a point of detection result based on an identification result of identifying the isolated point.

Preferably, the step of detecting an isolated point includes the steps of performing a gradation operation for a first target pixel region and a peripheral region of the target pixel region of the read image data, performing a gradation operation for a second target pixel region and a peripheral region of the target pixel region of the read image data, identifying a first isolated point based on mutual gradation comparison based on a gradation operation result for the first target pixel region and the peripheral region of the target pixel region, and identifying a second isolated point based on mutual gradation comparison based on a gradation operation result for the second target pixel region and the peripheral region of the target pixel region. The step of making a replacement of image data includes the steps of specifying a pixel having maximum gradation of pixels in the peripheral region of the first target pixel region, specifying a pixel having minimum gradation of pixels in the peripheral region of the first target pixel region, specifying a pixel having maximum gradation of pixels in the peripheral region of the second target pixel region, specifying a pixel having minimum gradation of pixels in the peripheral region of the second target pixel region, outputting the target pixel region as it is or replacing the first target pixel region with a pixel having maximum gradation or minimum gradation for output based on an identification result of identifying the first isolated point, and outputting the target pixel region as it is or replacing the second target pixel region with a pixel having maximum gradation or minimum gradation for output based on an identification result of identifying the second isolated point.

The image processing apparatus in accordance with this invention includes a character region identification portion identifying a character region in read image data obtained by reading an input image. The character region identification portion includes an isolated point detection portion for detecting an isolated point in the read image data, an isolated point removal portion for making a replacement of image data at a point of detection result of the isolated point detection portion, an edge identification portion performing edge identification of the read image data from which the isolated point has been removed, and a character region specification portion specifying a character region of the read image data after the edge identification. In this technique, after an isolated point is erased by performing isolated point identification as a step prior to edge identification, edge identification is further performed, so that isolated point noise can be removed with high accuracy.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram illustrating the shapes of isolated point filters performing an operation process in an isolated point filter operation portion.

DESCRIPTION OF THE PREFERRED EMBODIMENTS

Figure 1:
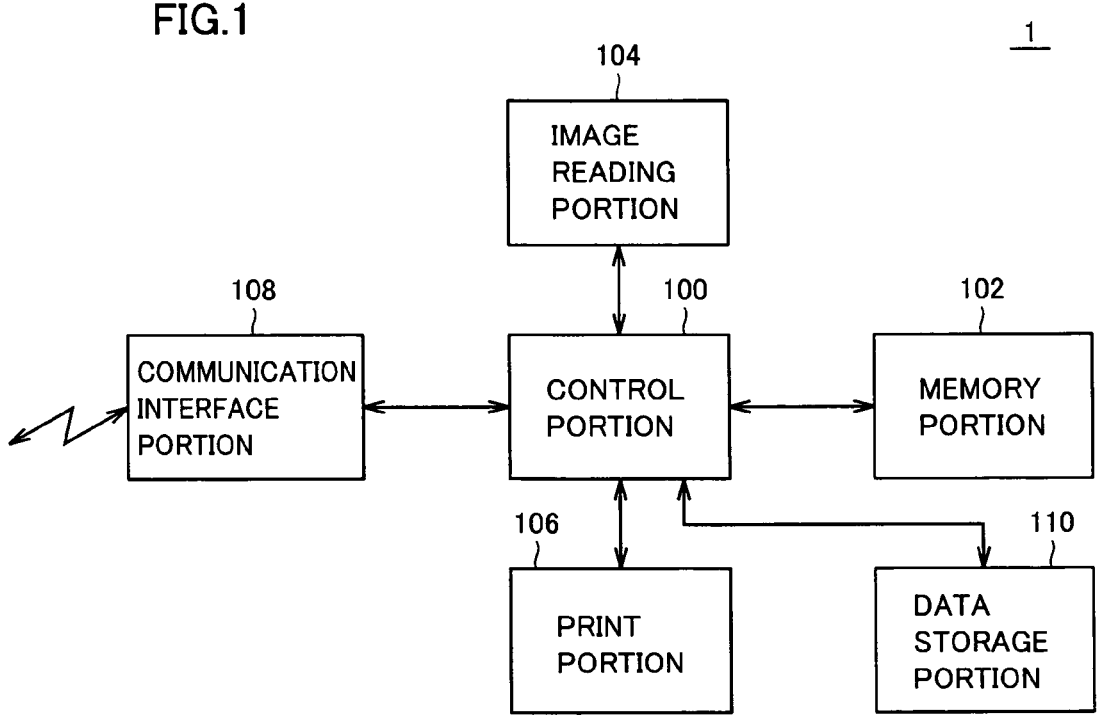
FIG. 1 is a diagram illustrating a schematic configuration of an image formation apparatus performing image processing in accordance with an embodiment of the present invention.

In the following, embodiments of the present invention will be described with reference to the figures. In the following description, the same parts and components will be denoted with the same reference characters. Their designations and functions are also the same.

First Embodiment

In the embodiments of the present invention, the image processing apparatus of the present invention is applied to a digital color copying machine (referred to as a copying machine hereinafter).

However, the image processing apparatus in accordance with the present invention is not limited to a copying machine and may be applied to a printer, a facsimile machine, or MFP (Multi Function Peripheral) which is a combination thereof.

Referring to FIG. 1, an image processing apparatus 1 performing image processing in accordance with an embodiment of the present invention includes a control portion 100, a memory portion 102, an image reading portion 104, a print portion 106, a communication interface portion 108, and a data storage portion 110.

Control portion 100 is typically formed of an arithmetical unit such as CPU (Central Processing Unit) and implements the image processing method in accordance with the present embodiment by executing a program.

Memory portion 102 is typically a volatile storage device such as a DRAM (Dynamic Random Access Memory) to hold a program executed in control portion 100, data necessary to execute a program, and the like.

Communication interface portion 108 is typically a part for transmitting/receiving data to/from a personal computer and the like via a network and includes, for example, a LAN adapter, driver software controlling the same, and the like.

Print portion 106 is a part for performing print processing and includes a hardware configuration concerning print processing and, in addition, a control device for controlling an operation of each part.

Data storage portion 110 is typically a nonvolatile storage device such as a hard disk drive and a flash memory to store image data and the like generated in control portion 100.

Using FIG. 2, a functional block diagram of the control portion performing the image processing method in accordance with the first embodiment of the present invention will be described.

Figure 2:
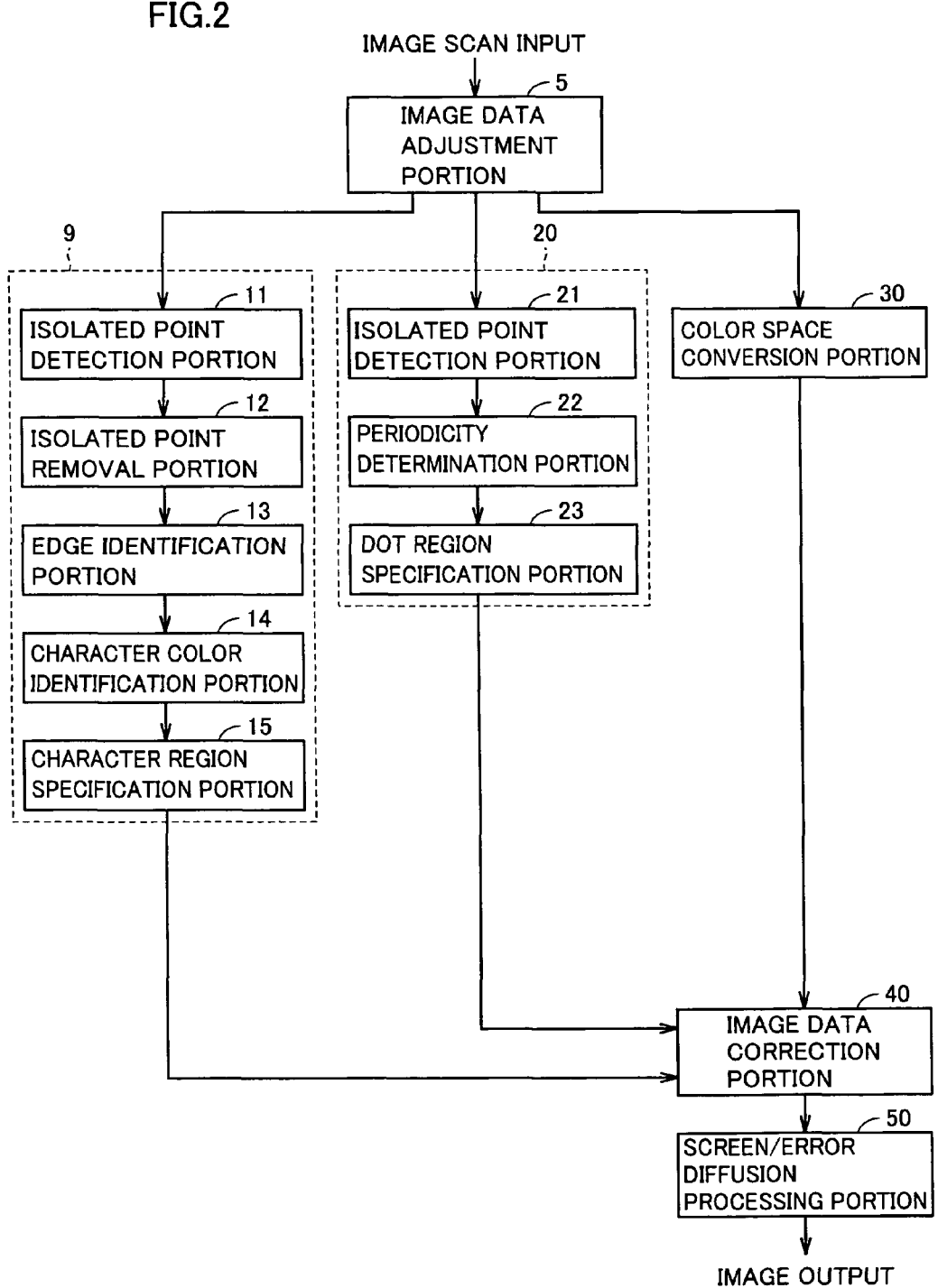
FIG. 2 is a functional block diagram of a control portion performing image processing in accordance with an embodiment of the present invention.

Referring to FIG. 2, here, the image processing method is implemented in control portion 100, for example, by loading an image processing program stored beforehand in memory portion 102.

Specifically, control portion 100 includes an image data adjustment portion 5, a character region identification portion 9, a dot region identification portion 20, a color space conversion portion 30, an image data correction portion 40, and a screen/error diffusion processing portion 50.

Image data read or scanned by image reading portion 104 is input to image data adjustment portion 5 as an image scan input.

In image data adjustment portion 5, so-called ground color removal processing of whitening the ground color for sharpening characters, color adjustment processing, and the like are performed on the input image data.

Then, the image data adjusted in image data adjustment portion 5 is output to each of character region identification portion 9, dot region identification portion 20, and color space conversion portion 30 making a conversion into YMCK data or sRGB color space data for output.

Character region identification portion 9 removes an isolated point based the input image data and also identifies a character region.

Furthermore, dot region identification portion 20 identifies a dot region by identifying an isolated point and then specifying the periodicity thereof.

Color space conversion portion 30 converts the input image data into YMCK data or sRGB color space data for output and outputs color information.

Character region identification portion 9 includes an isolated point detection portion 11, an isolated point removal portion 12, an edge identification portion 13, a character color identification portion 14, and a character region specification portion 15.

Isolated point detection portion 11 detects an isolated point in the image data input from image data adjustment portion 5.

Isolated point removal portion 12 makes a replacement of image data at the part of the isolated point detected by isolated point detection portion 11.

Edge identification portion 13 performs edge identification for identifying a character region using a so-called differential filter or the like for the image data from which an isolated point has been removed by isolated point removal portion 12.

Character color identification portion 14 identifies lightness and color saturation of the character region identified by edge identification.

Character region specification portion 15 classifies the character region identified by edge identification or the like, part-by-part, by lines, points, line widths of characters, and the like, and outputs the identification result to image data correction portion 40.

Dot region identification portion 20 includes an isolated point detection portion 21, a periodicity determination portion 22, and a dot region specification portion 23.

Isolated point detection portion 21 detects an isolated point for the input image data.

Periodicity determination portion 22 determines the periodicity of the detected isolated point.

Dot region specification portion 23 determines a dot region when isolated points are regularly arranged in a certain density range, based on the determination result in periodicity determination portion 22.

Then, the result is output to image data correction portion 40.

Image data correction portion 40 refers to the results of character region identification portion 9 and dot region identification portion 20 to perform an image data correction process on the output result of color space conversion portion 30. For example, in a character region, an edge reinforcement process is performed to increase visibility, and for a dot region, a smoothing process or the like is performed to reduce moiréby isolated points.

Then, in screen/error diffusion processing portion 50, a conversion is made into a data format by which a printer engine actually does printing in print portion 106.

Then, the output data is applied to print portion 106 and then an image is printed out (image output) by the printer engine provided in print portion 106.

Figure 3:
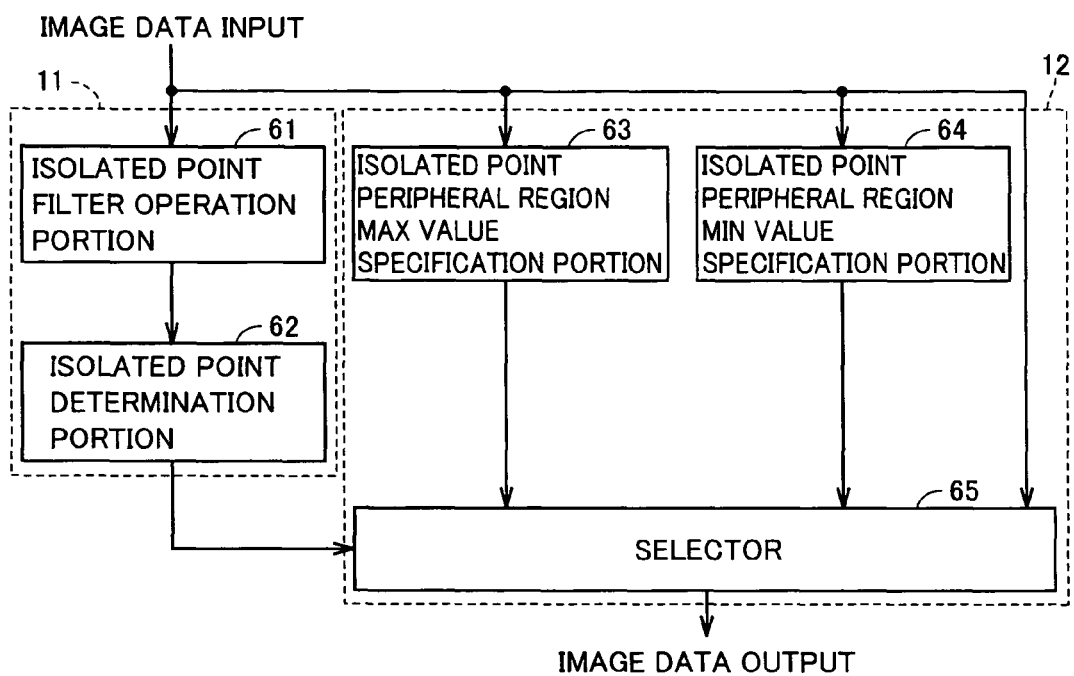
FIG. 3 is a functional block diagram of an isolated point detection portion and an isolated point removal portion in accordance with a first embodiment of the present invention.

Referring to FIG. 3, isolated point detection portion 11 in accordance with the first embodiment of the present invention includes an isolated point filter operation portion 61 and an isolated point determination portion 62.

Isolated point removal portion 12 includes an isolated point peripheral region Max value specification portion 63, an isolated point peripheral region Min value specification portion 64, and a selector 65.

Isolated point filter operation portion 61 performs a gradation operation for a target pixel region of interest and a peripheral region of the target pixel region of the image data.

Isolated point determination portion 62 identifies an isolated point based on mutual gradation comparison, based on the operation results of isolated point filter operation portion 61.

Isolated point peripheral region Max value specification portion 63 specifies a pixel having the maximum gradation of the pixels in the peripheral region of the target pixel region.

Isolated point peripheral region Min value specification portion 64 specifies a pixel having the minimum gradation of the pixels in the peripheral region of the target pixel region.

Selector 65 selects any one of the inputs of the output from isolated point peripheral region Max value specification portion 63, the output from isolated point peripheral region Min value specification portion 64 and the image data input as it is, based on the determination result of isolated point determination portion 62, and outputs the selected one as image data output.

In other words, selector 65 outputs the image data as it is, for the image data of the target pixel region, based on the determination result of isolated point determination portion 62. Alternatively, selector 65 replaces the image data of the target pixel region with the image data of the pixel specified by isolated point peripheral region Max value specification portion 63 and outputs the replaced data. Alternatively, selector 65 replaces the image data with the image data of the pixel specified by isolated point peripheral region Min value specification portion 64 and outputs the replaced data.

Using FIG. 4, the shapes of the isolated point filters for performing an operation process in isolated point filter operation portion 61 will be described.

Referring to FIG. 4, here, a 1×1 isolated point filter, a 2×1 isolated point filter, a 2×2 isolated point filter, and a 2×3 isolated point filter are shown.

Here, the reason that there are four kinds of 2×2 isolated point filter is that when a target pixel is at an isolated point location, the isolated point location that may be a target pixel includes four pixels, and thus the use of all four kinds of isolated point filters in the figure allows a 2×2 isolated point to be detected, irrespective of the location of a target pixel.

There is one kind of 1×1 isolated point filter because there is only one isolated point location that may be a target pixel.

In addition, the reason for using the 2×1 isolated point filter and the 2×3 isolated point filter is that when an original is read by a scanner or the like, due to positional misalignment between a pixel of CCD and an isolated point of the original, the isolated point is sometimes oval rather than being perfectly circular. It is noted that the 2×1 isolated point filter corresponds to positional misalignment of a 1×1 isolated point, and the 2×3 isolated point filter corresponds to positional misalignment of a 2×2 isolated point.

Here, the hatched region is a peripheral region of a target pixel region, and the region surrounded with the hatch (white region) is a target pixel region.

These isolated point filters are stored beforehand in memory portion 102 or the like. Then, an isolated point filter for performing the optimum isolated point removal is selected according to the size or the like of a character to be subjected to character region identification and is then used in the isolated point filter operation portion.

Here, the technique of identifying and removing an isolated point using an isolated point filter will be described using FIG. 3.

First, there are two kinds of isolated points, namely, a black isolated point and a white isolated point. An isolated point having gradation lower (darker) than that of a pixel in the peripheral region is called a black isolated point, and an isolated point having gradation higher (lighter) than that of a pixel in the peripheral region is called a white isolated point.

Isolated point filter operation portion 61 calculates each of the average gradation of pixels in a pixel region of interest (also referred to as a target pixel region) to be subjected to a filter operation process of an isolated point filter using a selected isolated point filter and the gradation of pixels in the peripheral region of the target pixel region.

Then, isolated point determination portion 62 identifies an isolated point or not based on whether or not the value of difference of the average gradation of the pixels in the target pixel region with respect to the minimum gradation of the pixels in the peripheral region of the target pixel region is equal to or greater than a threshold value, or whether or not the value of difference of the pixel in the peripheral region of the target pixel region with respect to the average gradation of the pixels in the target pixel region is equal to or greater than a threshold value.

If the above-noted value of difference is equal to or greater than the threshold value, an isolated point is determined.

On the other hand, if the value of difference is less than the threshold value, no isolated point is determined.

In other words, if the value of difference is less than the threshold value, the difference between the gradation of the pixels in the peripheral region and the average gradation of the pixels in the target pixel region is small, and thus neither a black isolated point nor a white isolated point is assumed. On the other hand, if the value of difference is equal to or greater than the threshold value, the difference between the gradation of the pixels in the peripheral region and the average gradation of the pixels in the target pixel region is large, and thus an isolated point is assumed. Here, the value of the threshold is set to a proper value as a gradation difference that determines an isolated point.

More specifically, if the value of difference of the average gradation of the pixels in the target pixel region with respect to the minimum gradation of the pixels in the peripheral region of the target pixel region is equal to or greater than the threshold value, isolated point determination portion 62 determines a black isolated point. In this case, the minimum gradation of the pixels in the peripheral region of the target pixel region>the average gradation of the pixels in the target pixel region holds.

On the other hand, if the value of difference of the maximum gradation of the pixels in the peripheral region of the target pixel region with respect to the average gradation of the pixels in the target pixel region is equal to or greater than the threshold value, a white isolated point is determined. In this case, the average gradation of the pixels in the target pixel region>the maximum gradation of the pixels in the peripheral region of the target pixel region holds.

Isolated point peripheral region Max value specification portion 63 specifies a pixel having the maximum gradation in the peripheral region of the target pixel region using the aforementioned isolated point filter and outputs the pixel data to selector 65.

Isolated point peripheral region Min value specification portion 64 specifies a pixel having the minimum gradation in the peripheral region of the target pixel region using the aforementioned isolated point filter and outputs the pixel data to selector 65.

Then, selector 65 selects any one of the input of the pixel data of the target pixel region of interest to be subjected to filter processing by the isolated point filter in response to an image data input, the output of isolated point peripheral region Max value specification portion 63, and the output of isolated point peripheral region Min value specification portion 64, based on the identification result of isolated point determination portion 62, and outputs the selected one as image data.

Specifically, if a black isolated point is determined in isolated point determination portion 62, selector 65 replaces the pixel to be subjected to filter operation processing by the isolated point filter with data with lighter gradation in the surroundings. Specifically, the pixel is replaced by the output result of isolated point peripheral region Max value specification portion 63 and output as image data. The part determined as a black isolated point by the conversion process is replaced by data with lighter gradation in the surroundings, so that the black isolated point is erased.

On the other hand, if a white isolated point is determined in isolated point determination portion 62, the pixel to be subjected to filter operation processing by the isolated point filter is replaced with data with darker gradation in the surroundings. Specifically, the pixel is replaced by the output result of isolated point peripheral region Min value specification portion 64 and output as image data.

If a black isolated point is determined by isolated point determination portion 62 in FIG. 3, it is replaced by the pixel specified by isolated point peripheral region Max value specification portion 63 for the target pixel region. If a white isolated point is determined, it is replaced by the pixel specified by isolated point peripheral region Min value specification portion 64 and then output. The part determined as a white isolated point by the conversion process is replaced by data with darker gradation in the surroundings, so that the white isolated point is erased.

Therefore, in the image processing method in accordance with the embodiment of the present invention, identification of an isolated point is performed before character region identification is performed, and as for the part identified as an isolated point, the part that is an isolated point is erased by being replaced with pixel data in the peripheral region, so that edge identification is performed based on the replaced image data. In the conventional technique, isolated point noise is removed by edge identification, and thus isolated point noise may be identified as a character region by edge identification, in some cases. However, in the image processing method of the present invention, after isolated point identification is performed to erase an isolated point as a step prior to edge identification, edge identification is further performed, so that isolated point noise can be removed with high accuracy.

Modification to First Embodiment

Figure 5:
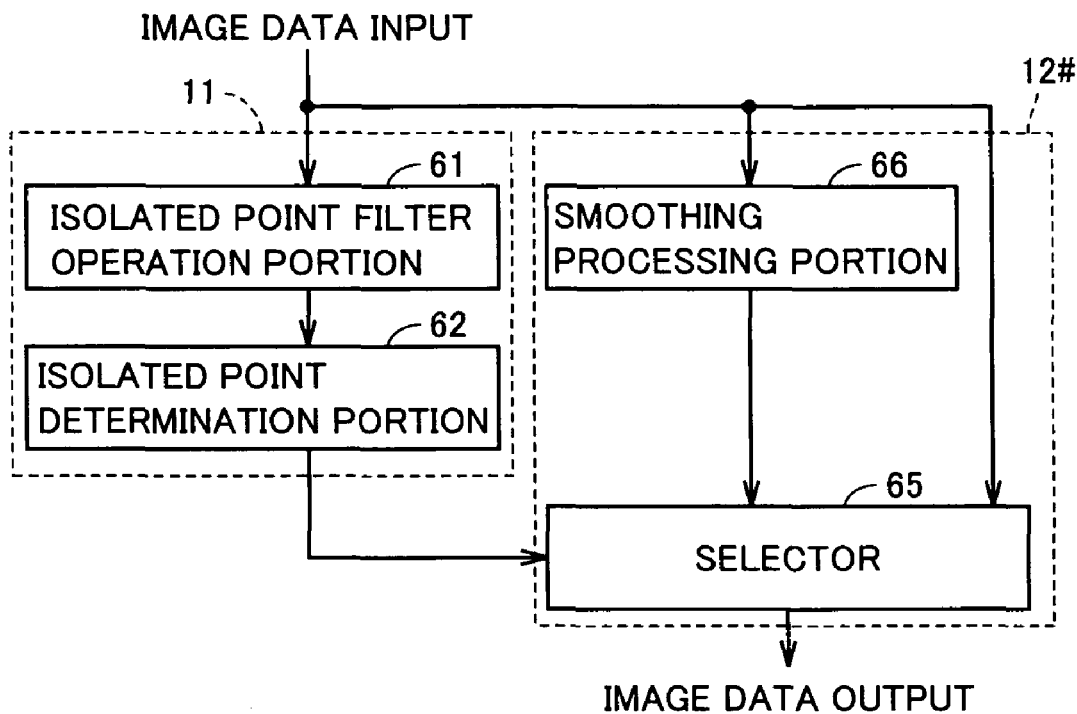
FIG. 5 is a diagram illustrating an isolated point detection portion and an isolated point removal portion in accordance with a modification to the first embodiment of the present invention.

Using FIG. 5, isolated point detection portion 11 and an isolated point removal portion 12# in accordance with a modification to the first embodiment of the present invention will be described.

Referring to FIG. 5, the modification differs in that isolated point removal portion 12 is replaced by isolated point removal portion 12#. The other points are similar and therefore the detailed description will not be repeated.

Isolated point removal portion 12# includes a smoothing processing portion 66 and selector 65.

Smoothing processing portion 66 performs smoothing processing on a target pixel region based on comparison with a gradation difference of a peripheral region of the target pixel region by the isolated point filter.

Selector 65 selects any one of the image data of the target pixel region subjected to smoothing processing by smoothing processing portion 66 and the image data input as it is, based on the determination result of isolated point determination portion 62, and outputs the selected one as an image data output.

Specifically, if a black isolated point or a white isolated point is determined based on the filter operation processing result for the target pixel region using the isolated point filter, isolated point determination portion 62 outputs the output result of smoothing processing portion 66 as image data. On the other hand, if neither a black isolated point nor a white isolated point is determined, the input image data is output as it is.

It is noted that, in this example, it is not necessary to determine a black isolated point or a white isolated point in isolated point determination portion 62, and if an isolated point is determined, the output result of smoothing processing portion 66 may be output as image data in selector 65. For example, as mentioned above, an isolated point is determined based on whether or not the value of difference of the average gradation of the pixels in the target pixel region with respect to the minimum gradation of the pixels in the peripheral region of the target pixel region is equal to or greater than the threshold value, or whether or not the value of difference of the pixels in the peripheral region of the target pixel region with respect to the average gradation of the pixels in the target pixel region is equal to or greater than the threshold value, and the output result of smoothing processing portion 66 is output as image data. On the other hand, if the value of difference is less than the threshold value, no isolated point is determined, and the input image data is output as it is in selector 65.

Therefore, in the character region identification in accordance with the modification to the first embodiment of the present invention, identification of an isolated point is performed before character region identification is performed, and as for the part identified as an isolated point, the part that is an isolated point is erased by being replaced with image data subjected to smoothing processing, and edge identification is performed based on the replaced image data. Therefore, isolated point noise can be removed with high accuracy.

Second Embodiment

In the technique described in the foregoing embodiment, identification of an isolated point is performed for a lightness signal in 1 plane obtained by reading an input image in a monochrome mode, and edge identification is performed based on the replaced image data. However, identification of an isolated point may be performed separately for 3 planes of RGB input obtained by reading an input image in a color mode, and after generation of a lightness signal, edge identification may be performed.

Here, a lightness signal is represented by linear coupling of a color image input (RGB input) $\alpha R+\beta G+\gamma B=V$ (lightness). Alternatively, lightness is generally represented using the minimum gradation Min (RGB) value of RGB input.

Here, if the generated input image (input document) is generated by overlapping a plurality of colors such as cyan, magenta, and yellow, the following problem may arise. For example, in a blue portion of the input document, blue is reproduced by overlapping magenta toner and cyan toner. In overlapping toner of these two colors, toner may be overlapped in a slightly displaced manner.

Figure 6:
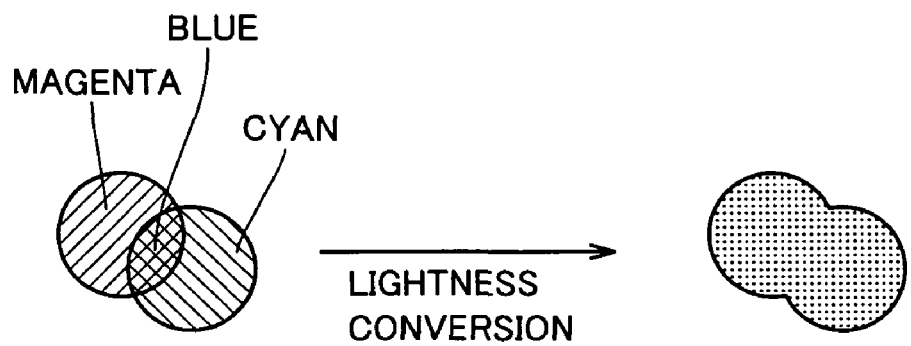
FIG. 6 is a diagram illustrating a case where a lightness conversion process is performed in an input image in which a blue isolated point and a red isolated point are overlapped with each other in a displaced manner.

Using FIG. 6, description will be made to a case where isolated point removal for a lightness signal is performed on an input document in which an isolated point of magenta toner and an isolated point of cyan toner overlap in a displaced manner in the input document.

Here, when an isolated point of magenta toner is read by CCD (assuming that it is read by eight bits for gradation of each RGB color), red light is absorbed, and then RGB=(10, 200, 200). Furthermore, when an isolated point of cyan toner is read by CCD, green light is absorbed, and then RGB=(200, 10, 200). When these two isolated points overlap, in the overlapped blue region (the region where magenta toner and cyan toner are mixed), red and green light is absorbed, and, for example, RGB=(10, 10, 200). Therefore, when the minimum gradation Min (RGB) is used as lightness in the overlapped blue region and the other magenta or cyan regions, the same value results in three regions of magenta, cyan and blue. Thus, in the isolated point identification using lightness, an isolated point is not detected as a circular isolated point and, as a result, cannot be detected with the isolated point filter shape as shown in FIG. 4, so that an isolated point may not be removed.

Figure 7:
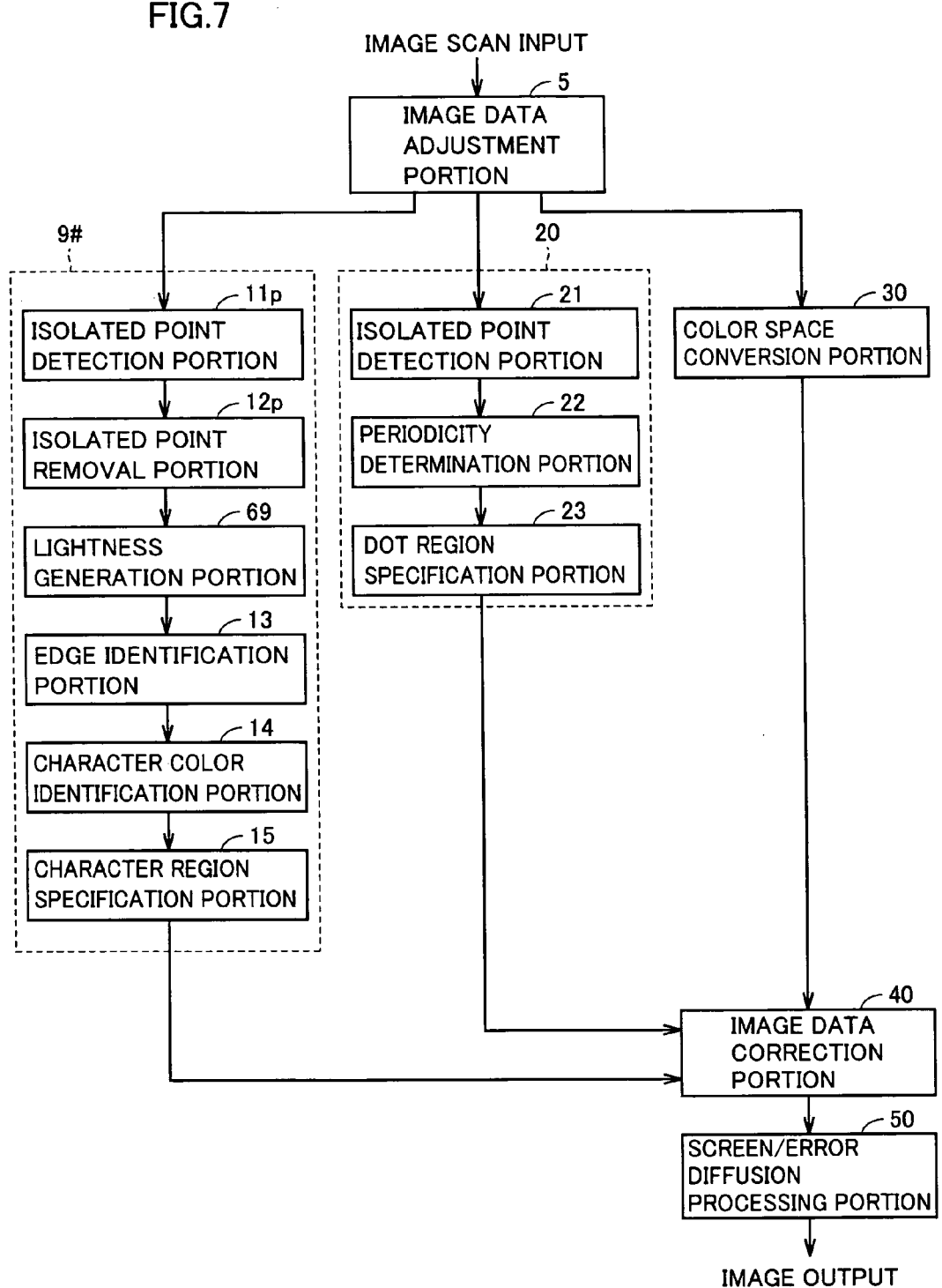
FIG. 7 is a functional block diagram of a control portion performing image processing in accordance with a second embodiment of the present invention.

Referring to FIG. 7, the control portion performing image processing in accordance with the second embodiment of the present invention differs from the functional block diagram of the control portion performing image processing in accordance with the first embodiment of the present invention as illustrated in FIG. 2 in that character region identification portion 9 is replaced with a character region identification portion 9#. The other points are similar and therefore the detailed description will not be repeated.

Character region identification portion 9# includes an isolated point detection portion 11p, an isolated point removal portion 12p, a lightness generation portion 69, edge identification portion 13, character color identification portion 14, and character region specification portion 15.

Using FIG. 8, the isolated point detection portion, the isolated point removal portion and the lightness generation portion in accordance with the second embodiment of the present invention will be described.

Figure 8:
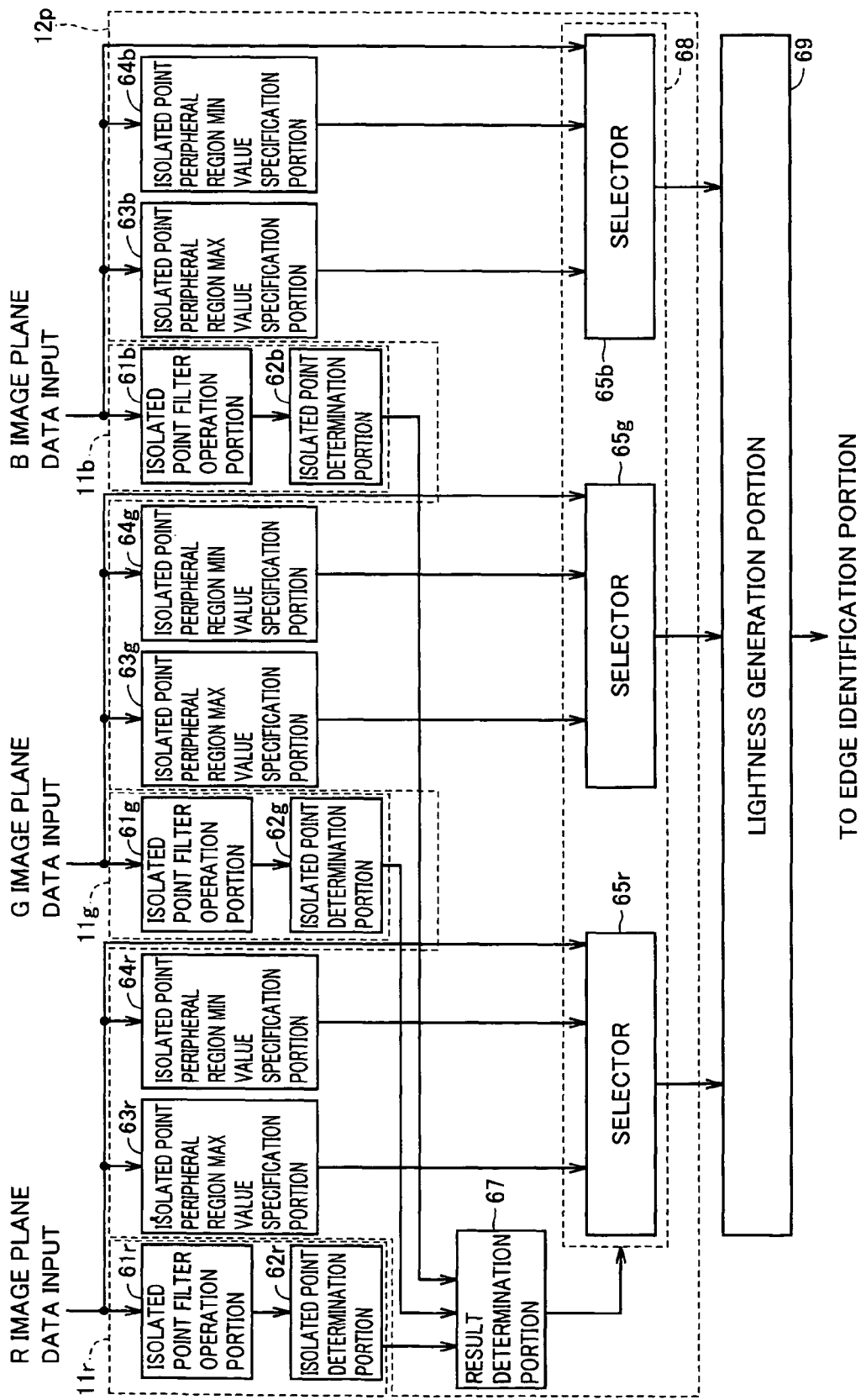
FIG. 8 is a diagram illustrating an isolated point detection portion, an isolated point removal portion and a lightness generation portion in accordance with the second embodiment of the present invention.

Referring to FIG. 8, here, the respective isolated point detection portions are provided corresponding to plane data of RGB of a color image input (RGB input), and isolated point removal is performed based on the result of the isolated point detection portion.

Specifically, an isolated point detection portion 11r identifying an isolated point of R image is provided corresponding to R image plane data which is an R image input, an isolated point detection portion 11g identifying an isolated point of G image is provided corresponding to G image plane data which is a G image input, and an isolated point detection portion 11b determining an isolated point of B image is provided corresponding to B image plane data which is a B image input.

In addition, an isolated point removal portion 12p is provided which removes an isolated point based on the result of isolated point determination by isolated point detection portions 11r, 11g, 11b.

Isolated point removal portion 12p includes isolated point peripheral region Max value specification portions 63r, 63g, 63b provided respectively corresponding to the plane data of R image, G image and B image. Similarly, isolated point peripheral region Min value specification portions 64r, 64g, 64b are provided respectively corresponding to the plane data of R image, G image and B image.

A result determination portion 67 is additionally provided which receives the respective identification results of isolated point determination portions 62r, 62g, 62b to give an instruction for a selection operation in a selector portion 68.

Here, isolated point detection portions 11r, 11g, 11b are similar to isolated point detection portion 11 as described above and therefore the detailed description will not be repeated.

Isolated point peripheral region Max value specification portions 63r, 63g, 63b and isolated point peripheral region Min value specification portions 64r, 64g, 64b are also similar to isolated point peripheral region Max value specification portion 63 and isolated point peripheral region Min value specification portion 64, respectively, and therefore the detailed description will not be repeated.

In the second embodiment of the present invention, result determination portion 67 is provided which gives an instruction for a selection operation of selector group 68 based on the determination result from isolated point determination portions 62r, 62g, 62b.

Result determination portion 67 performs conversion processing into replacement data in each of R image plane data, G image plane data and B image plane data, based on the respective determination results from isolated point detection portions 11r, 11g, 11b in R image plane data input, G image plane data input and B image plane data input, if an isolated point is detected in any one of isolated point detection portions 11r, 11g, 11b.

Specifically, the conversion processing into replacement data is performed in selectors 65r, 65g, 65b as described above.

For example, if a black isolated point is determined for any one of image plane data inputs in the isolated point determination portion, result determination portion 67 assumes that a black point isolated point is identified in all of the three planes, and the image plane data input is replaced with pixel data respectively output from isolated point peripheral region Max value specification portions 63r, 63g, 63b to selectors 65r, 65g, 65b and then output to lightness generation portion 69.

Furthermore, for example, if a white isolated point is determined for any one of the image plane data inputs in the isolated point determination portion, result determination portion 67 assumes that a white isolated point is identified in all of the three planes, and the image plane data input is replaced with pixel data respectively output from isolated point peripheral region Min value specification portions 64r, 64g, 64b to selectors 65r, 65g, 65b and then output to lightness generation portion 69.

In the other cases, that is, if no isolated point is determined in the isolated point determination portion for any image plane data input, the image plane data is output as it is to lightness generation portion 69.

Then, after a lightness signal is generated in lightness generation portion 69, edge identification is performed.

Since this processing allows the respective isolated points to be removed in the input image in which, for example, a blue isolated point and a red isolated point overlap in a displaced manner, isolated point noise can be removed with high accuracy with the relation of RGB image plane data being kept. In other words, in the input image in which a blue isolated point and a red isolated point overlap in a displaced manner, such a problem is eliminated in that an isolated point shape is left when lightness conversion processing is performed.

Third Embodiment

In the foregoing embodiments, a black isolated point and a white isolated point are determined and removed using a filter having the same shape as the isolated point filter identifying a black isolated point and a white isolated point. However, in some cases, depending on the kinds of characters or the like, it is desirable that an isolated point is removed with the black isolated point and white isolated point filters having different filter shapes.

For example, an isolated point "•" included in a black character "i," a voiced sound mark, punctuations, and the like on a white ground are black isolated points, and, for example, the region surrounded with four rectangles in the following Chinese character has a white isolated point shape and is a ground portion. "田"

Since the conditions of a black isolated point and a white isolated point included in characters may sometimes be varied as described above, it is desirable that the isolated point filter for black isolated point and the isolated point filter for white isolated point may be configured with such a size that does not affect the characters.

Figure 9:
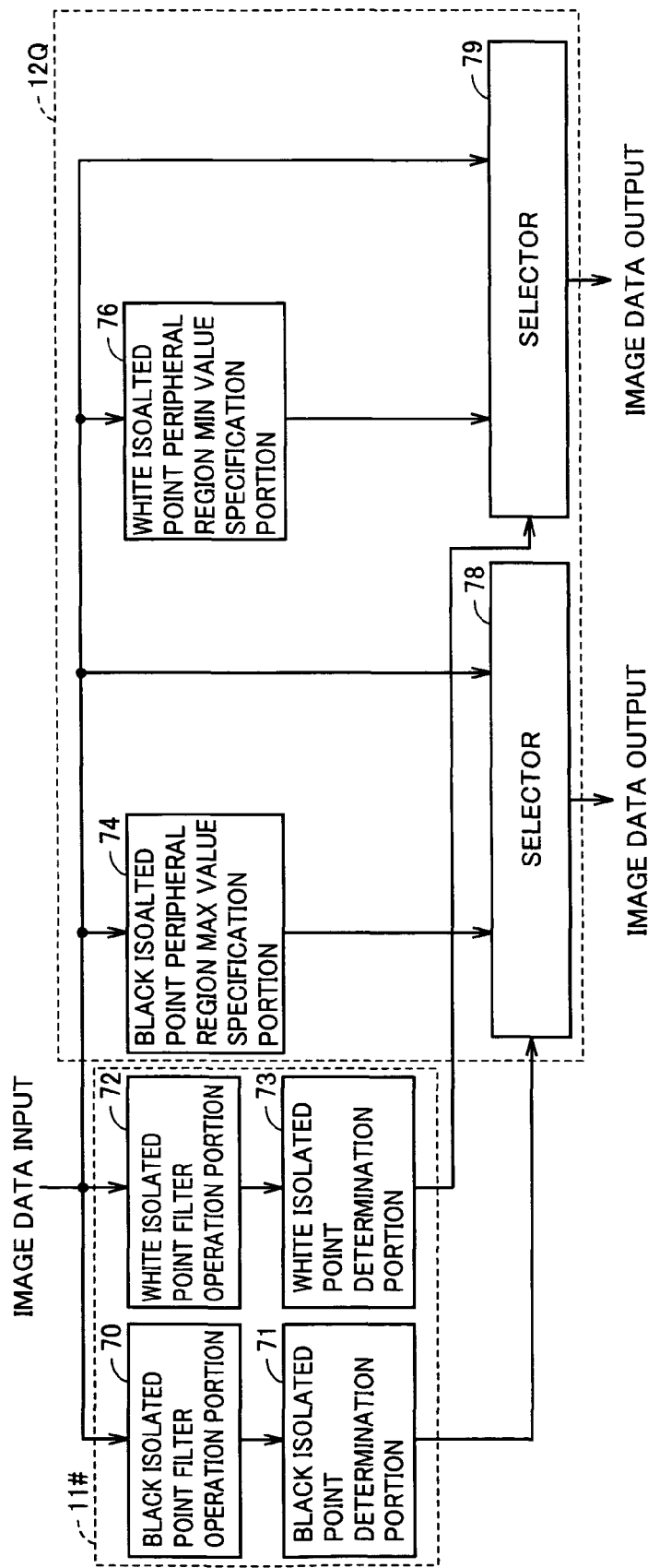
FIG. 9 is a functional block diagram illustrating an isolated point detection portion and an isolated point removal portion in accordance with a third embodiment of the present invention.

Referring to FIG. 9, an isolated point detection portion 11# in accordance with the third embodiment of the present invention replaces isolated point detection portion 11 in FIG. 2. Furthermore, an isolated point removal portion 12Q replaces isolated point removal portion 12 in FIG. 2.

Isolated point removal portion 11# includes a black isolated point filter operation portion 70, a black isolated point determination portion 71, a white isolated point filter operation portion 72, and a white isolated point determination portion 73.

Black isolated point filter operation portion 70 performs the similar filter operation processing as described above in the isolated point filter provided corresponding to a black isolated point.

On the other hand, white isolated point filter operation portion 72 performs the similar filter operation processing as described above in the isolated point filter provided corresponding to a white isolated point.

Black isolated point determination portion 71 determines a black isolated point based on the result of operation processing by black isolated point filter operation portion 70.

Specifically, black isolated point determination portion 71 determines an isolated point or not based on whether or not the value of difference of the average gradation of the pixels in the target pixel region with respect to the minimum gradation of the pixels in the peripheral region of the target pixel region is equal to or greater than the threshold value. If the value of difference is equal to or greater than the threshold value, a black isolated point is determined. On the other hand, if the value of difference is less than the threshold value, no isolated point is determined.

White isolated point determination portion 73 determines a white isolated point based on the result of operation processing by white isolated point filter operation portion 70.

Specifically, white isolated point determination portion 73 determines an isolated point or not based on whether or not the value of difference of the pixels in the peripheral region of the target pixel region with respect to the average gradation of the pixels in the target pixel region is equal to or greater than the threshold value. If the value of difference is equal to or greater than the threshold value, a white isolated point is determined. On the other hand, if the value of difference is less than the threshold value, no isolated point is determined.

Isolated point removal portion 12Q includes a black isolated point peripheral region Max value specification portion 74, a white isolated point peripheral region Min value specification portion 76, and selectors 78, 79.

Black isolated point peripheral region Max value specification portion 74 specifies a pixel having the maximum gradation of the pixels in the peripheral region of the target pixel region, in the isolated point filter provided corresponding to a black isolated point.

White isolated point peripheral region Min value specification portion 76 specifies a pixel having the maximum gradation of the pixels in the peripheral region of the target pixel region, in the isolated point filter provided corresponding to a white isolated point.

Selector 78 outputs an image data input as it is or replaces the image data input with the pixel output from black isolated point peripheral region Max value specification portion 74 and outputs the replaced data, based on the determination result of black isolated point determination portion 71.

Selector 79 outputs an image data input as it is or replaces the image data input with the pixel output from white isolated point peripheral region Min value specification portion 76 and outputs the replaced data, based on the determination result of white isolated point determination portion 73.

Then, although not shown, the image data output which is replaced as necessary by selector 78 and the image data output which is replaced as necessary by selector 79 are combined together and output to edge identification portion 13 with a black isolated point and a white isolated point removed.

In the configuration in accordance with the embodiment of the present invention, the black isolated point filter and the white isolated point filter are formed with different sizes, so that the filter operation processing can be preformed with the isolated point filter appropriately adapted corresponding to a character region. Therefore, isolated point noise can be removed accurately according to the input data.

It is noted that although a black isolated point and a white isolated point are independently determined in this example, two determination processes may be performed successively and replacement processing may be performed based on the result thereof.

It is noted that the image formation apparatus in accordance with the present invention is not limited to MFP as described above and any image formation apparatus may be employed, such as a printer and a facsimile machine. A program may be provided which allows a computer to perform the function of control portion 100 as described above. Such a program may be recorded in a computer readable recording medium such as a flexible disk, CD-ROM (Compact Disk-Read Only Memory), ROM (Read Only Memory), RAM (Random Access Memory) and a memory card attached to a computer and be provided as a program product. Alternatively, the program recorded in a recording medium such as a hard disk installed in a computer may be provided. The program downloaded via a network may be provided.

It is noted that the program in accordance with the present invention may allow processing to be performed by invoking required modules with a prescribed sequence and at a prescribed timing, among the program modules provided as a part of operation system (OS) of a computer. In this case, the program itself does not include the aforementioned modules and processing is performed in cooperation with OS. Such a program that does not include modules may also be included in the program in accordance with the present invention.

Furthermore, the program in accordance with the present invention may be incorporated in a part of another program. Also in this case, the program itself does not include the modules included in another program and the processing is performed in cooperation with another program. Such a program that is incorporated in another program may also be included in the program in accordance with the present invention.

The provided program product is installed in a program storage portion such as a hard disk for execution. It is noted that the program product includes the program itself and the recording medium having the program recorded thereon.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing apparatus comprising a character region identification portion identifying a character region of read image data obtained by reading an input image,
   said character region identification portion including
   an isolated point detection portion for detecting an isolated point of said read image data,
   said isolated point detection portion including:
      an isolated point filter operation portion performing a gradation operation for a target pixel region and a peripheral region of the target pixel region of said read image data, and
      a determination portion identifying an isolated point based on mutual gradation comparison, based on an operation result of said isolated point filter operation portion;
   an isolated point removal portion for making a replacement of image data at a point of detection result by said isolated point detection portion,
   said isolated point removal portion including:
      a first pixel specification portion specifying a pixel having maximum gradation of pixels in the peripheral region of said target pixel region,
      a second pixel specification portion specifying a pixel having minimum gradation of pixels in the peripheral region of said target pixel region, and
      a selection portion outputting said target pixel region as it is or replacing said target pixel region with a pixel specified by one of said first and second pixel specification portions for output based on a determination result of said determination portion;
   an edge identification portion performing edge identification of the read image data from which an isolated point is removed, and
   a character region specification portion specifying a character region of said read image data after said edge identification.

2. The image processing apparatus according to claim 1, wherein said determination portion determines an isolated point or not based on whether or not an absolute value of difference between average gradation of pixels in said target pixel region and maximum gradation and minimum gradation of pixels in the peripheral region of said target pixel region is equal to or greater than a threshold value.

3. The image processing apparatus according to claim 2, wherein if the difference between maximum gradation and minimum gradation of pixels in the peripheral region of said target pixel region and average gradation of pixels in said target pixel region is positive, said determination portion further determines a white isolated point, and if the difference between maximum gradation and minimum gradation of pixels in the peripheral region of said target pixel region and average gradation of said target pixel is negative, said determination portion further determines a black isolated point.

4. The image processing apparatus according to claim 3, wherein if a white isolated point is determined based on a determination result of said determination portion, said selection portion replaces said target pixel region with a pixel specified by said second pixel specification portion for output, and if a black isolated point is determined based on a determination result of said determination portion, said selection portion replaces said target pixel region with a pixel specified by said first pixel specification portion for output.

5. The image processing apparatus according to claim 1, wherein
said read image data includes a plurality of plane data respectively corresponding to multiple colors,
a plurality of isolated point detection portions for detecting an isolated point are further provided respectively corresponding to said plurality of plane data, and
said isolated point removal portion makes a replacement of image data at a point of detection result based on an identification result of said plurality of isolated point detection portions.

6. The image processing apparatus according to claim 1, wherein
said isolated point detection portion includes
a first isolated point filter operation portion performing a gradation operation for a first target pixel region and a peripheral region of the target pixel region of said read image data,
a second isolated point filter operation portion performing a gradation operation for a second target pixel region and a peripheral region of the target pixel region of said read image data,
a first determination portion identifying a first isolated point based on mutual gradation comparison based on an operation result of said first isolated point filter operation portion, and
a second determination portion identifying a second isolated point based on mutual gradation comparison based on an operation result of said second isolated point filter operation portion, and
said isolated point removal portion includes
a first pixel specification portion specifying a pixel having maximum gradation of pixels in the peripheral region of said first target pixel region,
a second pixel specification portion specifying a pixel having minimum gradation of pixels in the peripheral region of said first target pixel region,
a third pixel specification portion specifying a pixel having maximum gradation of pixels in the peripheral region of said second target pixel region,
a fourth pixel specification portion specifying a pixel having minimum gradation of pixels in the peripheral region of said second target pixel region, and
a selection portion outputting said target pixel region as it is or replacing said target pixel region with a pixel specified by one of said first to fourth pixel specification portions for output based on determination results of said first and second determination portions.

7. The image processing apparatus according to claim 6, wherein a size of said first target pixel region is different from a size of said second target pixel region.

8. An image processing method of identifying a character region of read image data obtained by reading an input image, comprising the steps of:
detecting an isolated point of said read image data in a processor, including the steps of:
performing a gradation operation for a target pixel region and a peripheral region of the target pixel region of said read image data, and
identifying an isolated point based on mutual gradation comparison, based on an operation result;
making a replacement of image data at a point of detection result where said isolated point is detected, in said processor, including the steps of:
specifying a pixel having maximum gradation of pixels in the peripheral region of said target pixel region,
specifying a pixel having minimum gradation of pixels in the peripheral region of said target pixel region, and
outputting said target pixel region as it is or replacing said target pixel region with a pixel having maximum gradation or a pixel having minimum gradation of output based on an identification result of said isolated point;
performing edge identification of the read image data from which the isolated point is removed, in said processor; and
specifying, in said processor, a character region of said read image data after said edge identification.

9. The image processing method according to claim 8, wherein
said read image data includes a plurality of plane data respectively corresponding to multiple colors,
in said step of detecting an isolated point, an isolated point is detected corresponding to each of said plurality of plane data, and
in said step of making a replacement of image data, image data is replaced at a point of detection result based on an identification result of identifying said isolated point.

10. The image processing method according to claim 8, wherein
said step of detecting an isolated point includes the steps of
performing a gradation operation for a first target pixel region and a peripheral region of the target pixel region of said read image data,
performing a gradation operation for a second target pixel region and a peripheral region of the target pixel region of said read image data,
identifying a first isolated point based on mutual gradation comparison based on a gradation operation result for said first target pixel region and the peripheral region of the target pixel region, and
identifying a second isolated point based on mutual gradation comparison based on a gradation operation result for said second target pixel region and the peripheral region of the target pixel region, and
said step of making a replacement of image data includes the steps of
specifying a pixel having maximum gradation of pixels in the peripheral region of said first target pixel region, specifying a pixel having minimum gradation of pixels in the peripheral region of said first target pixel region, specifying a pixel having maximum gradation of pixels in the peripheral region of said second target pixel region, specifying a pixel having minimum gradation of pixels in the peripheral region of said second target pixel region, outputting said target pixel region as it is or replacing said first target pixel region with a pixel having maximum gradation or minimum gradation for output based on an identification result of identifying said first isolated point, and outputting said target pixel region as it is or replacing said second target pixel region with a pixel having maximum gradation or minimum gradation for output based on an identification result of identifying said second isolated point.

11. A computer readable medium having a program recorded thereon for performing identification of a character region of read image data obtained by reading an input image, comprising the steps of:

detecting an isolated point of said read image data, including the steps of:
    performing a gradation operation for a target pixel region and a peripheral region of the target pixel region of said read image data, and
    identifying an isolated point based on mutual gradation comparison, based on an operation result;
  making a replacement of image data at a point of detection result where said isolated point is detected, including the steps of:
    specifying a pixel having maximum gradation of pixels in the peripheral region of said target pixel region,
    specifying a pixel having minimum gradation of pixels in the peripheral region of said target pixel region, and
    outputting said target pixel region as it is or replacing said target pixel region with a pixel having maximum gradation or a pixel having minimum gradation for output based on an identification result of said isolated point;
  performing edge identification of the read image data from which the isolated point is removed; and
  specifying a character region of said read image data after said edge identification.

12. The computer readable medium according to claim 11, wherein said read image data includes a plurality of plane data respectively corresponding to multiple colors, in said step of detecting an isolated point, an isolated point is detected corresponding to each of said plurality of plane data, and in said step of making a replacement of image data, image data is replaced at a point of detection result based on an identification result of identifying said isolated point.

13. The computer readable medium according to claim 11, wherein said step of detecting an isolated point includes the steps of performing a gradation operation for a first target pixel region and a peripheral region of the target pixel region of said read image data, performing a gradation operation for a second target pixel region and a peripheral region of the target pixel region of said read image data, identifying a first isolated point based on mutual gradation comparison based on a gradation operation result for said first target pixel region and the peripheral region of the target pixel region, and identifying a second isolated point based on mutual gradation comparison based on a gradation operation result for said second target pixel region and the peripheral region of the target pixel region, and said step of making a replacement of image data includes the steps of specifying a pixel having maximum gradation of pixels in the peripheral region of said first target pixel region, specifying a pixel having minimum gradation of pixels in the peripheral region of said first target pixel region, specifying a pixel having maximum gradation of pixels in the peripheral region of said second target pixel region, specifying a pixel having minimum gradation of pixels in the peripheral region of said second target pixel region, outputting said target pixel region as it is or replacing said first target pixel region with a pixel having maximum gradation or minimum gradation for output based on an identification result of identifying said first isolated point, and outputting said target pixel region as it is or replacing said second target pixel region with a pixel having maximum gradation or minimum gradation for output based on an identification result of identifying said second isolated point.

* * * * *